March 31, 1959    N. B. F. HOLLANDER    2,879,627
CONTAINER FOR CULTIVATING KERNELS AND SEEDS
Filed March 12, 1957
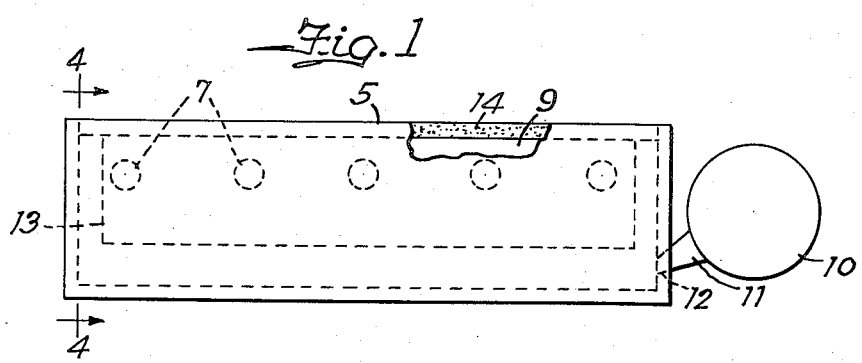
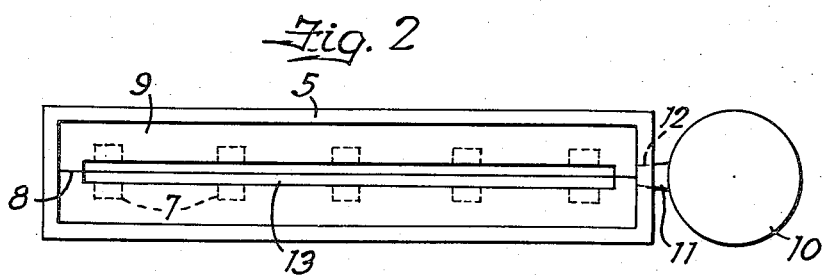
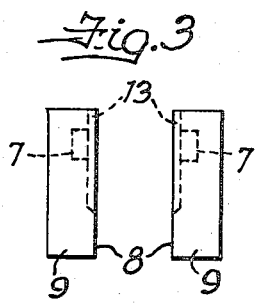 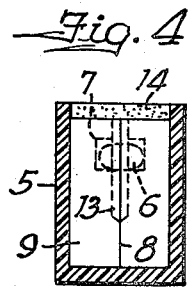
Inventor
Nils Bertil Fredrik Hollander
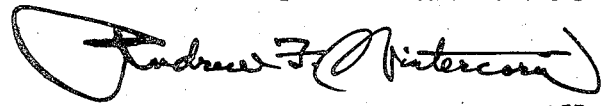
Atty.

United States Patent Office 2,879,627
Patented Mar. 31, 1959

2,879,627
CONTAINER FOR CULTIVATING KERNELS AND SEEDS

Nils Bertil Fredrik Hollander, Stockholm, Sweden, assignor to Testor Chemical Co., Rockford, Ill., a corporation of Illinois Application March 12, 1957, Serial No. 645,538

Claims priority, application Sweden March 24, 1956

12 Claims. (Cl. 47—1.2)

This invention relates to a container for cultivating kernels and seeds.

It is well known that soil may be excluded in the cultivation of kernels, seeds, and the like, and that sand, gravel and other materials can be substituted if a suitable nutritive solution is added. It is, therefore, the principal object of my invention to provide a transparent container having housed therein a case made in two or more parts of transparent material having recesses provided therein to accommodate the kernels or seeds at the most advantageous level from the standpoint of encouraging cultivation and growth, the container having means provided in connection therewith for intermittently wetting the kernels or seeds with a suitable nutritive solution, the transparency of the container and case therein enabling one to check the progress of cultivation and growth from time to time without disturbing or in any way altering the ideal conditions provided for same. Thus, the invention will find use as instruction material in schools, and seed experiment laboratories, as well as in the homes and hospitals and other institutions, where it will be found to be of particular interest to shut-ins.

The invention is illustrated in the accompanying drawing, in which—

Fig. 1 is a side view of a complete unit embodying my invention;

Fig. 2 is a top view with the layer of sand or gravel indicated in Fig. 1 omitted;

Fig. 3 is an end view of the two halves of the case removed from the container, and Fig. 4 is a section on the line 4—4 of Fig. 1.

The came reference numerals are applied to corresponding parts throughout the views.

Referring to the drawing, the reference numeral 5 designates a container made of clear plastic material so that the kernels or seeds, like that indicated at 6 (Fig. 4), inserted in registering recesses 7 provided in the abutting faces 8 of the two halves of the case 9, that is likewise made of clear plastic material, may be easily seen through the wall of the container from either side thereof, thus enabling one to note the progress of the cultivation and growth from time to time, and making such a unit of great value in schools, laboratories, and various institutions as well as in the homes. A hollow rubber ball or bulb 10 has communication by means of its nozzle 11 with the inside of the container 5 through a hole 12 provided in one end wall thereof, near the bottom, on the longitudinal center line thereof, and this serves as a means of periodically wetting the kernels or seeds 6 with a nutritive solution and immediately thereafter withdrawing the solution again into the bulb, very little solution being, of course, required to fill the container at least up to the level of the kernels or seeds 6, because of the small amount of space left in between and around the halves 9 of the seed case or cassette. There is accordingly very little wasting of solution apt to occur by evaporation, because practically all of the unused solution returns to the bulb. The abutting faces 8 of the two case halves 9 are relieved above, below and between the recesses 7 intermediate the ends thereof, as indicated at 13, to facilitate the inlet and outlet of solution to and from the recesses 7 and also to accommodate the sprouts ultimately extending upwardly from the kernels or seeds, and the roots ultimately extending downwardly therefrom.

The operation should be clear from the foregoing description; at suitable intervals—say, once a day—the bulb 10 is squeezed to expel the nutritive solution therefrom into the container 5 up to the upper level of the kernels or seeds 6 in recesses 7, whereupon the bulb is released and the solution sucked out again back into the bulb. The kernels or seeds thus receive the nutrition necessary for their cultivation and later growth. a layer of sand or gravel 14, or any other suitable fill, may be provided on top of the case halves 9 up to or below the upper edge of the container 5 for the sake of appearance, or that may be dispensed with if it tends to interfere with the easy visibility of the seeds or kernels 6 at all times, that being the main purpose for the present construction.

It is believed the foregoing description conveys a good understanding of the objects and advantages of my invention. The appended claims have been drawn to cover all legitimate modifications and adaptations.

I claim:

1. As an article of manufacture, an open top container of transparent material, and a case also made of transparent material insertable with a loose fit inside said container, said case being split in a vertical plane substantially through the middle thereof and having in the abutting faces of the halves registering recesses at a level intermediate the top and bottom of the case to hold a seed or kernel at a fixed elevation relative to the container regardless of the depth of water or solution which the container may contain.

2. As an article of manufacture, an open top container of transparent material, and a case also made of transparent material insertable with a loose fit inside said container, said case being split in a vertical plane substantially through the middle thereof and having in the abutting faces of the halves registering recesses at a level intermediate the top and bottom of the case, said container having an opening provided therein in one end thereof at a level near the bottom and substantially in the plane of the abutting faces of said case halves.

3. In combination, an open top container of transparent material, a case also made of transparent material insertable with a loose fit inside said container, said case being split in a vertical plane substantially through the middle thereof and having in the abutting faces of the halves registering recesses at a level intermediate the top and bottom of the case, at least one of the halves of the case having its inner face relieved above and below the recess therein to provide space between the abutting faces of the case halves, and a pump device communicating with said case at a level below said recesses to pump nutritive solution into and out of said container for the intermittent wetting of a seed or kernel deposited in the registering recesses.

4. In combination, an open top container of transparent material, a case also made of transparent material insertable with a loose fit inside said container, said case being split in a vertical plane substantially through the middle thereof and having in the abutting faces of the halves thereof, all at one level intermediate the top and bottom of the case, a plurality of registering recesses in laterally spaced relationship to one another, at least one of the halves of the case having its inner face relieved above, below and between the recesses to provide space between the abutting faces of the case halves, and a pump device communicating with said case at a level below said recesses to pump nutritive solution into and out of said container for the intermittent wetting of seeds or kernels deposited in the registering recesses.

5. As an educational device, a transparent container, a transparent case inserted in said container having a plurality of chambers provided therein each for reception of a seed or kernel to be cultivated, all of said chambers being approximately at the same level with respect to the bottom of the container, a nutritive wetting solution, and means whereby all of said seeds or kernels while disposed in said chamber in the case disposed in said container may be briefly immersed substantially simultaneously in the nutritive solution and isolated again therefrom, their progress of cultivation and growth being easily followed by viewing the different seeds or kernels in said chambers from outside the container between immersions.

6. As an article of manufacture, an open top container of transparent material, and a case also made of transparent material insertable in said container, said case being split in a vertical plane and providing between the abutting faces of the two parts thereof a recess at a level intermediate the top and bottom of the case adapted to hold a seed or kernel at a fixed elevation relative to the container regardless of the depth of water or solution which the container may contain.

7. As an article of manufacture, an open top container of transparent material, and a case also made of transparent material insertable in said container, said case being split in a vertical plane and providing between the abutting faces of the two parts thereof a recess at a level intermediate the top and bottom of the case adapted to hold a seed or kernel at a fixed elevation relative to the container regardless of the depth of water or solution which the container may contain, at least one of the parts of the case having its inner face relieved above and below the recess to provide stem and root clearance space between the abutting faces of the case parts.

8. As an article of manufacture, an open top container of transparent material, and a case also made of transparent material insertable in said container, said case being split in a vertical plane and providing between the abutting faces of the two parts thereof, all at one level intermediate the top and bottom of the case, a plurality of recesses in laterally spaced relationship, at least one of the two case parts having its inner face relieved above, below and between the recesses to provide stem and root space between the abutting faces of the two case parts.

9. As an article of manufacture, an open top container of transparent material, and a case also made of transparent material insertable in said container, said case being split in a vertical plane and providing between the abutting faces of the two parts thereof a recess at a level intermediate the top and bottom of the case adapted to hold a seed or kernel at a fixed elevation relative to the container regardless of the depth of water or solution which the container may contain, said container having a bottom opening provided therein for inlet and outlet of water or solution.

10. As an article of manufacture, an open top container of transparent material, and a case also made of transparent material insertable in said container, said case being split in a vertical plane and providing between the abutting faces of the two parts thereof, all at one level intermediate the top and bottom of the case, a plurality of recesses in laterally spaced relationship, said container having a bottom opening provided therein for inlet and outlet of water or solution.

11. As an article of manufacture, an open top container of transparent material, and a case also made of transparent material insertable in said container, said case being split in a vertical plane and providing between the abutting faces of the two parts thereof a recess at a level intermediate the top and bottom of the case adapted to hold a seed or kernel at a fixed elevation relative to the container regardless of the depth of water or solution which the container may contain, and a pump device communicating with the bottom portion of said case to pump nutritive solution or water into and out of said container.

12. As an article of manufacture, an open top container of transparent material, and a case also made of transparent material insertable in said container, said case being split in a vertical plane and providing between the abutting faces of the two parts thereof, all at one level intermediate the top and bottom of the case, a plurality of recesses in laterally spaced relationship, and a pump device communicating with the bottom portion of said case to pump nutritive solution or water into and out of said container.

References Cited in the file of this patent

UNITED STATES PATENTS

| | | |
|---|---|---|
| 2,026,322 | Raines | Dec. 31, 1935 |
| 2,281,068 | Farnham | Apr. 28, 1942 |
| 2,600,718 | Wilson | June 17, 1952 |

FOREIGN PATENTS

| | | |
|---|---|---|
| 116,226 | Austria | Feb. 10, 1930 |
| 120,768 | Germany | May 29, 1901 |
| 325,994 | Great Britain | Mar. 6, 1930 |